US012660849B2

(12) United States Patent
White

(10) Patent No.: US 12,660,849 B2
(45) Date of Patent: Jun. 23, 2026

(54) DETACHABLE RECEIVER HITCH ASHTRAY ASSEMBLY

(71) Applicant: Timothy White, Las Vegas, NV (US)

(72) Inventor: Timothy White, Las Vegas, NV (US)

( * ) Notice: Subject to any disclaimer, the term of this patent is extended or adjusted under 35 U.S.C. 154(b) by 495 days.

(21) Appl. No.: 18/300,264

(22) Filed: Apr. 13, 2023

(65) Prior Publication Data

US 2024/0138473 A1 May 2, 2024

Related U.S. Application Data

(60) Provisional application No. 63/475,306, filed on Oct. 31, 2022.

(51) Int. Cl.
*A24F 19/00* (2006.01)
*B60D 1/06* (2006.01)

(52) U.S. Cl.
CPC ...... *A24F 19/0092* (2013.01); *A24F 19/0071* (2013.01); *B60D 1/06* (2013.01)

(58) Field of Classification Search
CPC ... A24F 19/0092; A24F 19/0071; B60D 1/06; B60D 1/065; B60D 1/04
See application file for complete search history.

(56) References Cited

U.S. PATENT DOCUMENTS

2022/0194149 A1* 6/2022 Choe ...................... B60D 1/065

* cited by examiner

*Primary Examiner* — Jason D Shanske
*Assistant Examiner* — Al-Birr Rahman Chowdhury
(74) *Attorney, Agent, or Firm* — Steven Rinehart

(57) ABSTRACT

A vehicular ashtray detachably affixable to a receiver or ball of an automobile, the ashtray comprises a receptacle and a slidable lid. In various embodiments, the ashtray is detachable to a ball and comprises a collar circumscribing an open bottom end on a base of the receptacle adapted to receive a ball of a hitch.

1 Claim, 4 Drawing Sheets

100

Hitch
112

Protuberance/handle
110

Slidable lid
108

118

Hollow recess
106

114

116

Sidewall
104

Receptacle 102

300

410

300

402

DETACHABLE RECEIVER HITCH ASHTRAY ASSEMBLY

FIELD OF THE INVENTION

This invention relates to automotive accessories and more particularly relates to an ashtray detachably affixable to a ball hitch of an automobile.

BACKGROUND

Description of the Related Art

In general, smoking takes place in outdoor environments, often while smokers are recreating, including tailgating, barbequing and camping events. Trucks are often involved in realizing these events, as trucks are used to haul camping gear, tailgating and equipment. Traditionally in the art, ashtrays have been integrated with garbage cans and vehicle interiors for ease of use, but ashtrays have been phased out of these assemblies and smoking is now discourage in indoor and cloistered areas.

There is a vehicular ashtray which overcomes these difficulties with the prior art. It would be desirable to provide a portable vehicular ashtray adapted to integrate with ball hitch on the receiver of a vehicle which does not require separate assembly and which safely enclosed ash and embers.

SUMMARY

From the foregoing discussion, it should be apparent that a need exists for a portable vehicular ashtray with ball hitch attachment means. Accordingly, the present invention has been developed to provide a portable vehicular ashtray, the ashtray comprising: a receptacle defining a hollow interior recess for storing ash and embers, the receptacle defining an open top end; a track spanning one a breadth of the receptacle; a slideable lid traveling within the track, the lid comprising a superiorly-rising handle; a hitch.

The receptacle may be one of cubic, cylindrical and spherical. The receptacle may comprise a plurality of planar sidewalls.

The top surface of the lid may be planar. The handle comprises a protuberance in some embodiments.

A detachable, portable vehicular ashtray is provided, the ashtray comprising: a receptacle defining a hollow interior recess for storing ash and embers, the receptacle defining an open top end and an open bottom end; a cylindrical collar affixed to a bottom surface of the receptacle circumscribing the open bottom end, wherein the open bottom end is dimensioned to receive a ball of hitch; wherein the collar defines a slot within which one or more brackets travel; one or brackets hingedly affixed to the collar.

The chain may be affixed to one of a sidewall and the base.

The one or more brackets may be L-shaped.

The one or more brackets may comprise a cantilever and define an aperture.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It is an object of the present invention to provide a vehicular ashtray which is a safe in outdoor environments and when transporting ash, which ashtray is detachably affixable to ball hitch in some embodiments to facilitate emptying of the ashtray and use of the ball for hauling.

Figure 1:
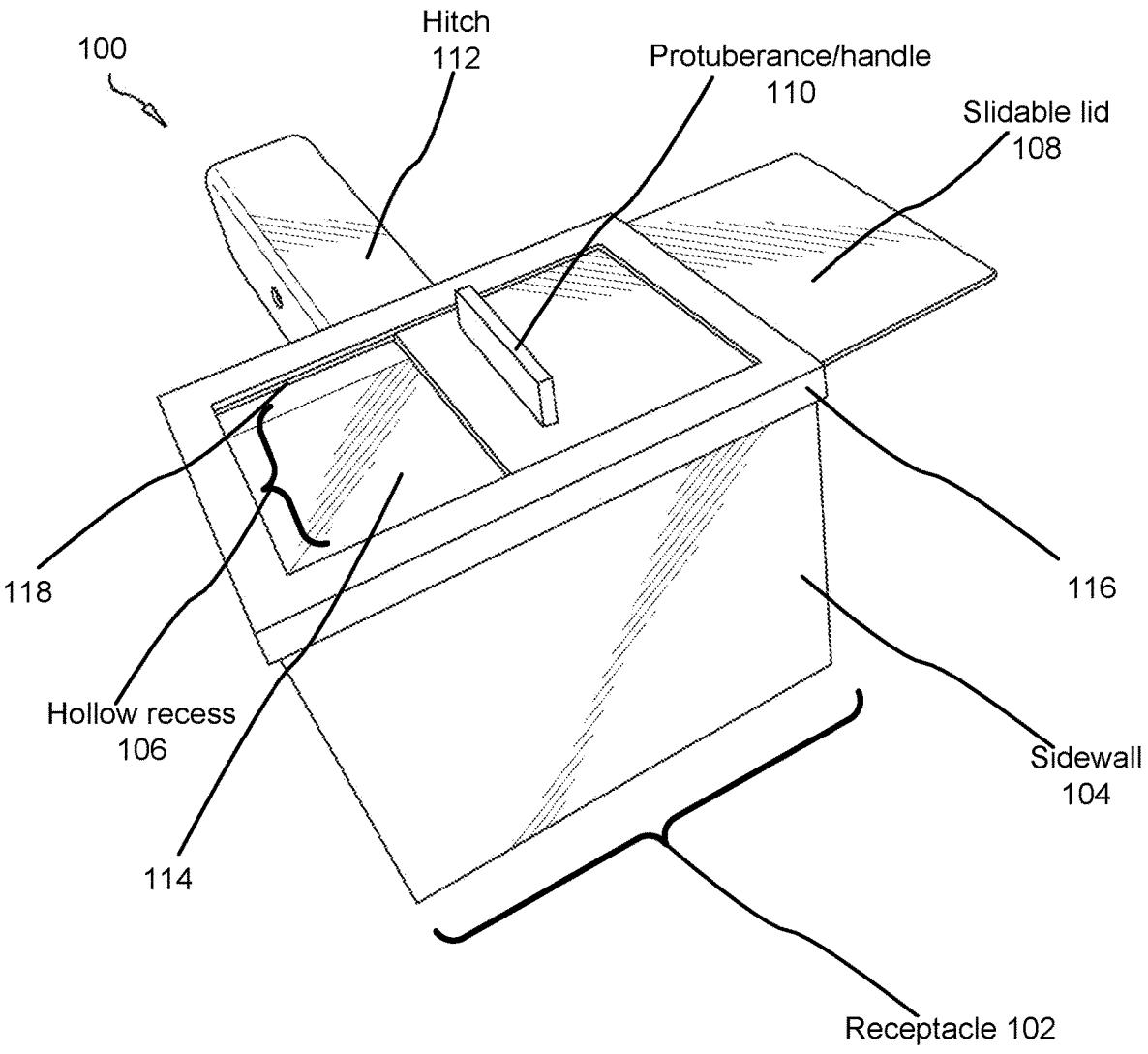
FIG. 1 is a side perspective view illustrating one embodiment of a vehicular ashtray in accordance with the present invention.

FIG. 1 is a side perspective view illustrating one embodiment of a vehicular ashtray 100 in accordance with the present invention.

The vehicular ashtray 100 comprises a cubic receptacle 102 with an open top end 114. The receptacle 102 may be cubic, spherical, circular, ovoid, or irregularly-shaped. In various embodiments a flange 116 circumscribes the open top end. The receptable 102 and/or the flange 116 may define a track 118 within which a slidable lid 108 travels. The may extend across a width or breadth of the open top end 114.

In various embodiments, the receptacle 102 is formed from steel, titanium, aluminum, alloys or other fireproof or fire resistant materials known to those of skill in the art.

In various embodiments, a slidable lid 108 travels within the track 118. The lid may comprise a handle 110 (i.e., protuberance 110) which juts superiorly from the top surface of the lid 108, which top surface may be planar. In other embodiments, the lid 108 is hingedly affixed to the receptacle 102 or other components (such as the hitch 112).

A hitch 112 is affixed to the sidewall 104 of the receptacle 102, which hitch 112 mounts to hitch receiver of a vehicle.

The receptacle 102 defines a hollow interior recess 106 for holding or stowing during transport ash and embers. The receptacle 102 may have planar sidewalls 104, a planar bottom surface and/or a planar top surface.

Figure 2:
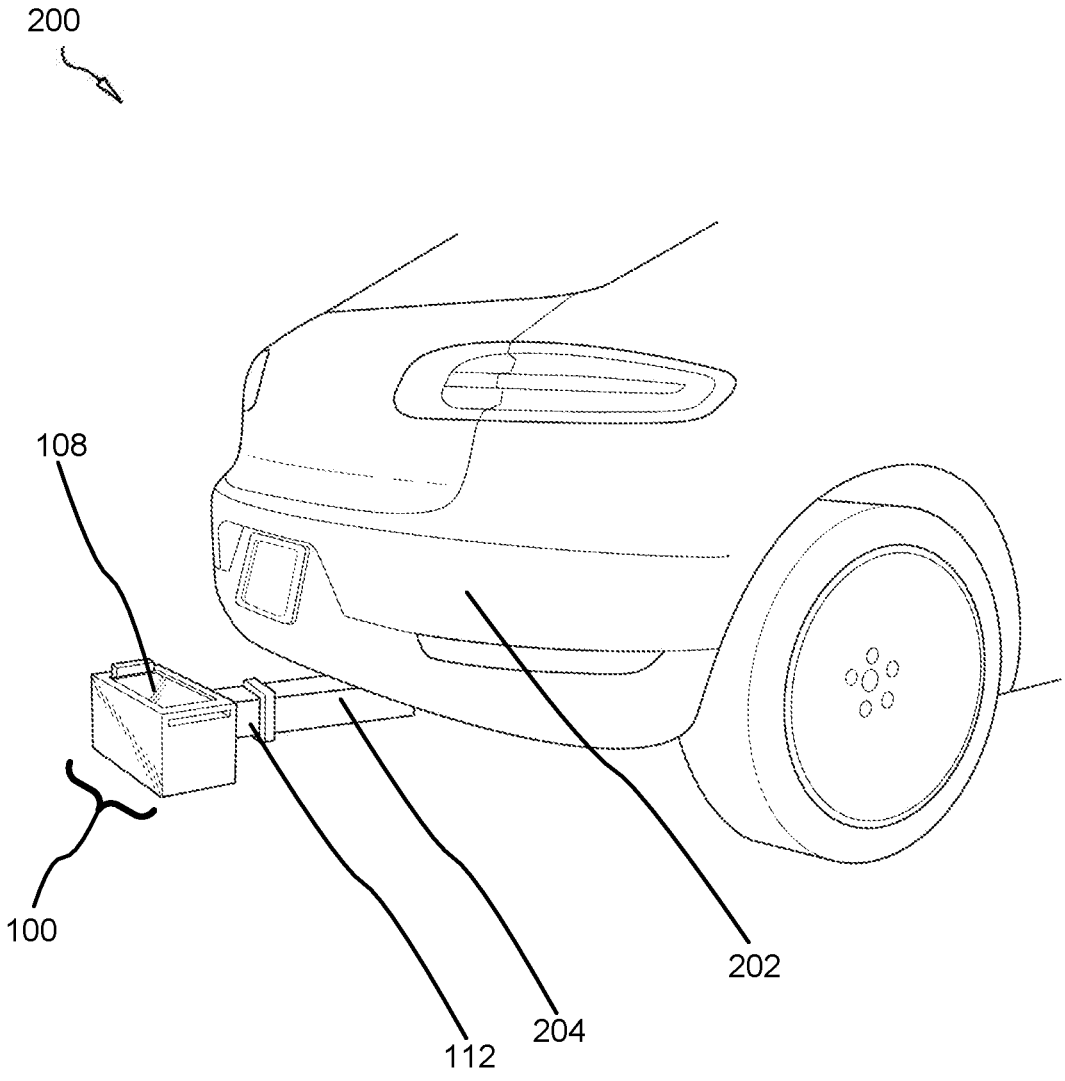
FIG. 2 is an environmental, side perspective view illustrating one embodiment of a vehicular ashtray in accordance with the present invention.

FIG. 2 is an environmental, side perspective view illustrating one embodiment of a vehicular ashtray 200 in accordance with the present invention.

As shown ashtray 100 inserts into a hitch receiver 204 of a vehicle 202.

Figure 3:
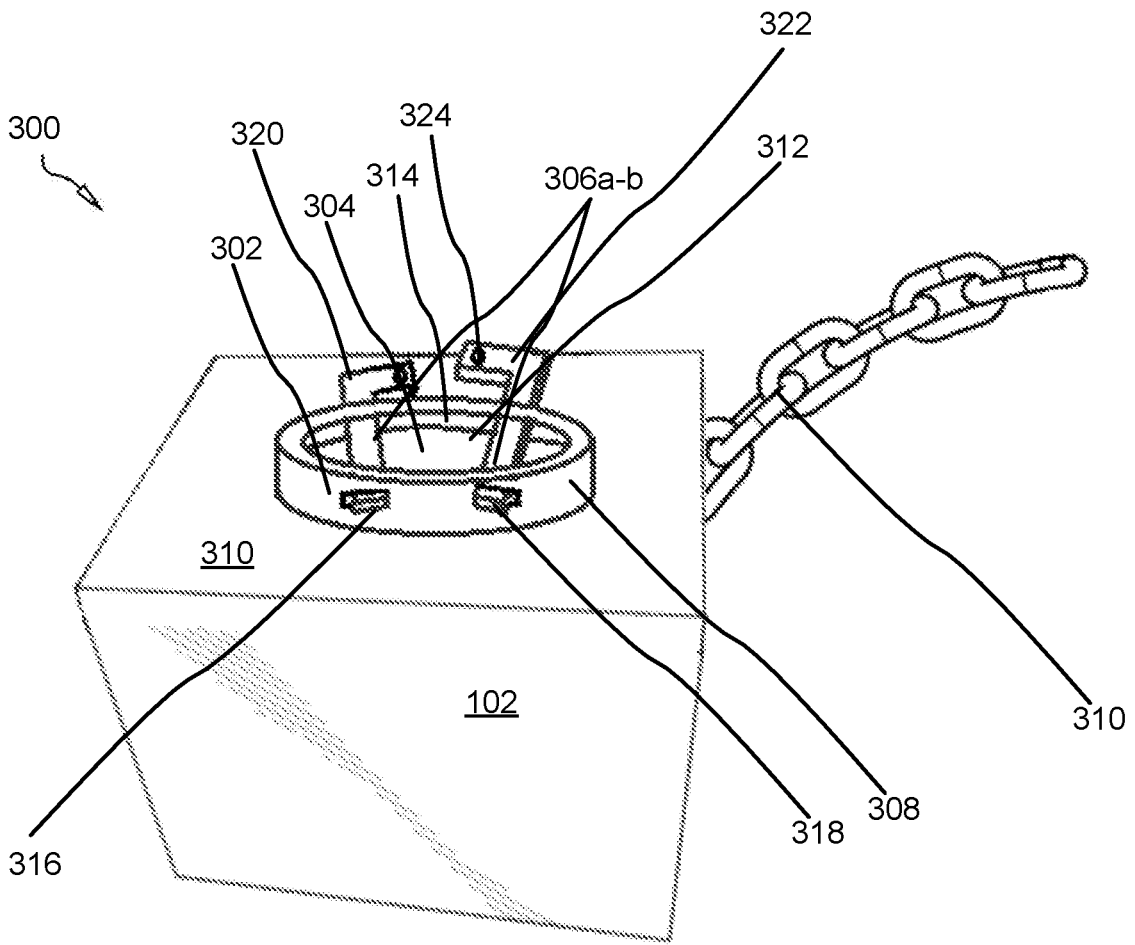
FIG. 3 is an inverted, side perspective view illustrating one embodiment of a detachable vehicular ashtray in accordance with the present invention.

FIG. 3 is an inverted, side perspective view illustrating one embodiment of a detachable vehicular ashtray 300 in accordance with the present invention.

In various embodiments, the base 310 of the receptacle 102 is affixed to collar 302 which circumscribes a cylindrical recess 312. The recess 312 is adapted and dimensioned to receive the ball 402 of a hitch. Once inserted, the ball 402 is affixed in place by one or more brackets 306 which slide laterally within a slot 314 defined by the collar 302 or cut into the collar 302. A proximal end 316 of each bracket 306 may be hingedly affixed to the collar 306 a diametrically opposed position on the collar 302 to the terminal ends 320 of the brackets 306. In various embodiments, the terminal ends 320 of the brackets 306 comprise cantilevers 322 jutting laterally from the bracket 306.

The brackets 306 may be L-shaped.

The cantilevers 322 may define apertures 324 into which a cotter pin is inserted.

Figure 4:
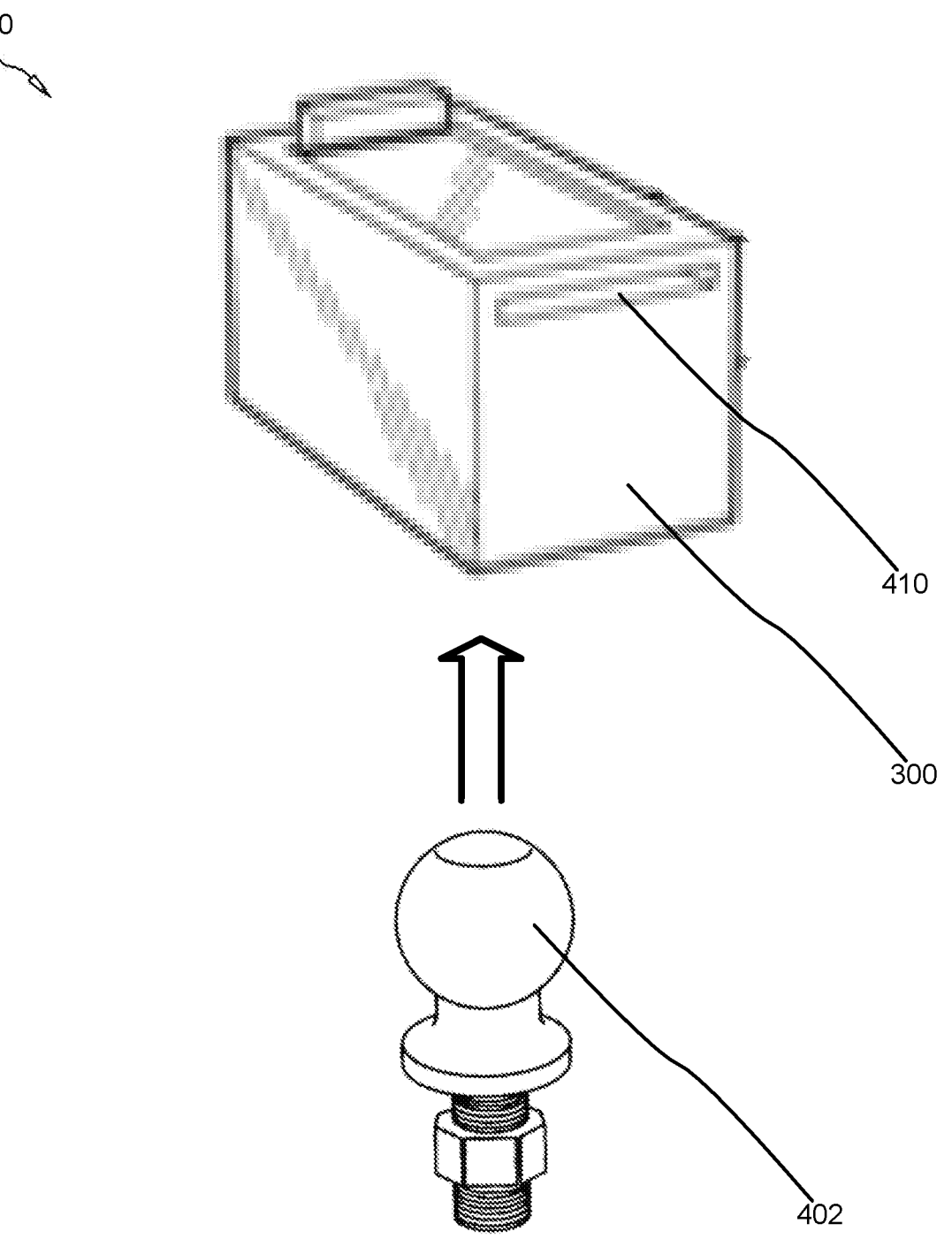
FIG. 4 is an environmental, side perspective view illustrating another embodiment of a detachable vehicular ashtray in accordance with the present invention.

FIG. 4 is an environmental, side perspective view illustrating another embodiment of a detachable vehicular ashtray 400 in accordance with the present invention.

The ashtray 300 may comprise a safety chain 310 adapted to be affixed to the receiver 204.

The detachable ashtray 400 affixed vertically onto a ball 402 as shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A detachable, portable vehicular ashtray, the ashtray comprising: a receptacle defining a hollow interior recess for storing ash and embers, the receptacle defining an open top end and an open bottom end;

a slidable lid covering the open top end of the receptacle and movable within a track defined by the receptacle;

a cylindrical collar affixed to a bottom surface of the receptacle circumscribing the open bottom end, wherein the open bottom end is dimensioned to receive a ball of a hitch;

wherein the collar defines a slot within which one or more brackets travel;

the one or more brackets being hingedly affixed to the collar and configured to secure the ball of the hitch within the collar.

* * * * *